(12) United States Patent
Miura

(10) Patent No.: US 7,162,351 B2
(45) Date of Patent: Jan. 9, 2007

(54) ACCELERATION SENSOR MODULE

(75) Inventor: Hisanori Miura, Gamagoori (JP)

(73) Assignee: Denso Corporation, Kariya (JP)

( * ) Notice: Subject to any disclaimer, the term of this patent is extended or adjusted under 35 U.S.C. 154(b) by 160 days.

(21) Appl. No.: 11/041,628

(22) Filed: Jan. 25, 2005

(65) Prior Publication Data
US 2005/0171673 A1    Aug. 4, 2005

(30) Foreign Application Priority Data
Feb. 4, 2004    (JP)    ............... 2004-028285

(51) Int. Cl.
*G01P 15/125*    (2006.01)
*G06F 17/00*    (2006.01)

(52) U.S. Cl. .......................... 701/70; 701/46
(58) Field of Classification Search .................... None
See application file for complete search history.

(56) References Cited

U.S. PATENT DOCUMENTS 5,092,174 A * 3/1992 Reidemeister et al. ... 73/514.32
6,308,554 B1 * 10/2001 Mattes et al. ................. 73/1.37
7,092,806 B1 * 8/2006 Kumazawa et al. .......... 701/45

FOREIGN PATENT DOCUMENTS

JP    11-142426    * 5/1999
JP    2001-334908    12/2001

* cited by examiner

*Primary Examiner*—Michael J. Zanelli
(74) *Attorney, Agent, or Firm*—Posz Law Group, PLC

(57) ABSTRACT

An acceleration sensor module, installed in a front region and/or a side region of a vehicle, includes a sensing section and an adjusting section. The sensing section includes a capacitive detecting section and a converting section. The detecting section detects the acceleration of the vehicle. The converting section converts a capacitance value into a voltage value. The adjusting section includes an AD converter, a communication circuit, a power source section, and an oscillator. The AD converter converts an analog output of the converting section into a digital value. The communication circuit sends an output of the AD converter to a collision judging section. The power source section supplies electric power to each of the AD converter, the communication circuit, and the sensing section. The oscillator supplies the clock to the AD converter and to the converting section of the sensing section.

8 Claims, 6 Drawing Sheets

ACCELERATION SENSOR MODULE

CROSS-REFERENCE TO RELATED APPLICATION

This application is based upon and claims the benefit of priority from earlier Japanese Patent Application No. 2004-28285 filed on Feb. 4, 2004 so that the description of which is incorporated herein by reference.

BACKGROUND OF THE INVENTION

The present invention relates to an acceleration sensor module which is installed in a vehicle body to detect the change of acceleration occurring in case of collision or accident of the vehicle.

Many vehicles are recently equipped with airbag devices which are installed in the instrument panels of vehicles for protecting drivers and passengers from being injured when the vehicles are involved in collisions or accidents. The components of these airbag devices are roughly classified into a sensing section, an adjusting section, a collision judging section, and an actuating section. The sensing section, positioned at a front region or a side region of the vehicle, detects a negative acceleration generating in response to the collision or accident of the vehicle. The adjusting section executes necessary adjustments (e.g. AD conversion) based the detection result. The collision judging section compares the adjusted detection result with a reference value to judge the occurrence of any collision or accident. Then, the actuating section actuates (i.e. inflates) the airbag.

FIG. 10 shows a conventional acceleration sensor module for an airbag device (refer to the Japanese Patent Application Laid-open No. 2001-334908) which includes an acceleration sensor 100, an AD converter 102, a communication control circuit 104, a data conversion circuit 106, and a driver/receiver 108.

The acceleration sensor 100 detects an acceleration of the vehicle measurable at a position where the acceleration sensor 100 is disposed. The AD converter 102 converts an acceleration value detected by the acceleration sensor 100 into a digital value (i.e. digital acceleration data). The AD converter 102 sends the digital acceleration data to the communication control circuit 104. The communication control circuit 104, operating in response to a request of ECU (electronic control unit), transmits the digital acceleration data via the data conversion circuit 106 and the driver/receiver 108 to a power source signal line 110.

According to the above-described conventional system, the acceleration sensor 100 detecting the change of acceleration is not always accurate. More specifically, the AD converter 102 converts the detected acceleration value into a digital signal in synchronism with the clock generated from an oscillator. The acceleration sensor 100 is selectable from various types. For example, the acceleration sensor 100 is a capacitive sensor which includes a stationary electrode and a movable electrode which are opposed to each other to arrange a capacitor between them. The movable electrode causes a displacement relative to the stationary electrode. For example, the gap between the movable electrode and the stationary electrode changes in response to a change of acceleration occurring due to collision or accident of the vehicle. The electrostatic capacity of the capacitor changes in accordance with the change of the gap between the electrodes.

The clock produced from the oscillator is also used in the communication section and/or in the collision judging section. The power source section is thus subjected to a large variation or fluctuation of the load appearing at both rise and fall timings of the clock. Accordingly, the output voltage of the power source section causes undesirable variation or fluctuation correspondingly (refer to FIG. 4).

In the process of converting the change of capacitance into a voltage value in the acceleration sensor 100, the power source voltage may include a variation or fluctuation (i.e. noise) in the case of using the clock generated from the oscillator. The accuracy of the capacitance-voltage conversion will deteriorate. As the power source voltage serves as the reference voltages for the AD conversion and the capacitance-voltage conversion, the converted values will include adverse effects of the variation occurring in the reference voltages.

SUMMARY OF THE INVENTION

In view of the above-described problems, the present invention has an object to provide an acceleration sensor module which can eliminate adverse effects of the noise involved in the power source voltage, even in a case the sensing section is a capacitive type and utilizes the clock for the capacitance-voltage conversion, or even when the AD converter of the adjusting section utilizes the clock for the AD conversion.

In order to accomplish the above and other related objects, the acceleration sensor module of the present invention includes an oscillator disposed in either the sensing section or the adjusting section, and the clock supplied from the oscillator is supplied to the other of the sensing section and the adjusting section.

The first invention provides a front and/or side acceleration sensor module installed in a front region and/or a side region of a vehicle, including a sensing section and an adjusting section. The sensing section includes a capacitive detecting section and a converting section. The capacitive detecting section detects an acceleration of the vehicle. The converting section converts a capacitance value into a voltage value. On the other hand, the adjusting section includes an AD converter, a communication circuit, a power source section, and an oscillator. The AD converter converts an analog output of the converting section into a digital value. The communication circuit sends an output of the AD converter to a collision judging section. The power source section supplies electric power to each of the AD converter, the communication circuit, and the sensing section. And, the oscillator supplies clock to the AD converter and to the converting section of the sensing section.

According to the first invention, in the front and/or side acceleration sensor module, the sensing section detects the acceleration of the vehicle and performs the capacitance-voltage conversion. The adjusting section applies the AD conversion to the received acceleration signal and sends the converted digital data to the collision judging section. The converting section performs the capacitance-voltage conversion and the AD converter performs the AD conversion in synchronism with the clock generated from the oscillator in the adjusting section.

According to the front and/or side acceleration sensor module of the first invention, the sensing section and the adjusting section can commonly use a single oscillator. In other words, the acceleration sensor module of the first invention requires only one oscillator. The total number of parts used for the acceleration sensor module can be reduced.

Furthermore, the capacitance-voltage conversion of the converting section and the AD conversion of the AD converter are performed in synchronism with the clock generated from the oscillator of the adjusting section. Therefore, it becomes possible to prevent the generation of noise appearing on the power supply source from interfering with the capacitance-voltage conversion performed in the converting section. Thus, the converting section can properly perform the capacitance-voltage conversion.

According to the first invention, it is preferable that the converting section performs the capacitance-voltage conversion and the AD converter performs the AD conversion at staggered timings not agreeing with a rise or a fall of the clock.

With this arrangement, it becomes possible to surely prevent the noise appearing on the power source voltage from interfering with the capacitance-voltage conversion performed in the converting section or with the AD conversion performed in the AD converter.

It is also preferable that the collision judging section is disposed in a central acceleration sensor module installed in a central region of the vehicle.

With this arrangement, the front and/or side acceleration sensor module needs not have a collision judging section. The arrangement of the sensor module is simplified.

The second invention provides another front and/or side acceleration sensor module installed in a front region and/or a side region of a vehicle, including a sensing section and an adjusting section. The sensing section includes a capacitive detecting section, a converting section, and an oscillating section. The capacitive detecting section detects an acceleration of the vehicle. The converting section converts a capacitance value into a voltage value. The oscillating section supplies clock to the converting section. On the other hand, the adjusting section includes an AD converter, a communication circuit, and a power source section. The AD converter receives the clock supplied from the oscillating section and converts an analog output of the converting section into a digital value. The communication circuit sends an output of the AD converter to a collision judging section. And, the power source section supplies electric power to each of the AD converter, the communication circuit, and the sensing section.

According to the second invention, in the front and/or side acceleration sensor module, the sensing section detects the acceleration of the vehicle and performs the capacitance-voltage conversion. The adjusting section applies the AD conversion to the received acceleration signal and sends the converted digital data to the collision judging section. The adjusting section applies the AD conversion to the received acceleration signal and sends the converted digital data to the collision judging section. The converting section performs the capacitance-voltage conversion and the AD converter performs the AD conversion in synchronism with the clock generated from the oscillator in the sensing section.

According to the front and/or side acceleration sensor module of the second invention, the adjusting section and the sensing section can commonly use a single oscillator. In other words, the acceleration sensor module of the second invention requires only one oscillator. The total number of parts used for the sensor module can be reduced. Furthermore, the capacitance-voltage conversion of the converting section and the AD conversion of the AD converter are performed in synchronism with the clock generated from the oscillator of the sensing section. Therefore, it becomes possible to prevent the generation of noise appearing on the power supply source from interfering with the AD conversion performed in the AD converter. The converting section can properly perform the capacitance-voltage conversion. Thus, the AD converter can properly perform the AD conversion.

According to the second invention, it is preferable that the AD converter performs the AD conversion and the converting section performs the capacitance-voltage conversion at staggered timings not agreeing with a rise or a fall of the clock.

With this arrangement, it becomes possible to surely prevent the noise appearing on the power source voltage from interfering with the AD conversion performed in the AD converter or with the capacitance-voltage conversion performed in the converting section.

It is also preferable that the collision judging section is disposed in a central acceleration sensor module installed in a central region of the vehicle.

With this arrangement, the front and/or side acceleration sensor module needs not have a collision judging section. The arrangement of the sensor module is simplified.

The third invention provides a central acceleration sensor module installed in a central region of a vehicle, including a sensing section, an AD converter, a collision judging section, a power source section, and an oscillating section. The sensing section includes a capacitive detecting section and a converting section. The capacitive detecting section detects an acceleration of the vehicle. The converting section converts a capacitance value to a voltage value. The AD converter converts an analog output of the converting section into a digital value. The collision judging section judges a probability of collision of the vehicle based on an input from the AD converter. The power source section supplies electric power to each of the sensing section, the AD converter, and the collision judging section. And, the oscillating section supplies the clock to the sensing section and to the AD converter.

According to the third invention, in the central acceleration sensor module, the AD converter converts an analog output of the sensing section into a digital value. The collision judging section judges a probability of collision of the vehicle based an input from the AD converter. The sensing section and the AD converter operate in synchronism with the clock supplied from the oscillator.

According to the central acceleration sensor module of the third invention, the sensing section and the AD converter can commonly use a single oscillator. The arrangement of the sensor module is simplified. Furthermore, the sensing section and the AD converter operate in synchronism with the clock of the oscillator. Therefore, the noise appearing on the power supply source gives no adverse effect to the capacitance-voltage conversion performed in the converting section of the sensing section or to the AD conversion performed in the AD converter.

According to the third invention, it is preferable that the central acceleration sensor module further includes a receiving circuit. The receiving circuit receives an acceleration signal detected by a front and/or side acceleration sensor module installed in a front region and/or a side region of a vehicle. Furthermore, the receiving circuit outputs this acceleration signal to the collision judging section. The receiving circuit receives electric power supplied from the power source section.

With provision of the receiving circuit, it becomes possible to accurately judge the probability of collision of the vehicle considering the accelerations detected in the front and/or side regions of the vehicle which are entered from the receiving circuit.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENTS

Figure 1:
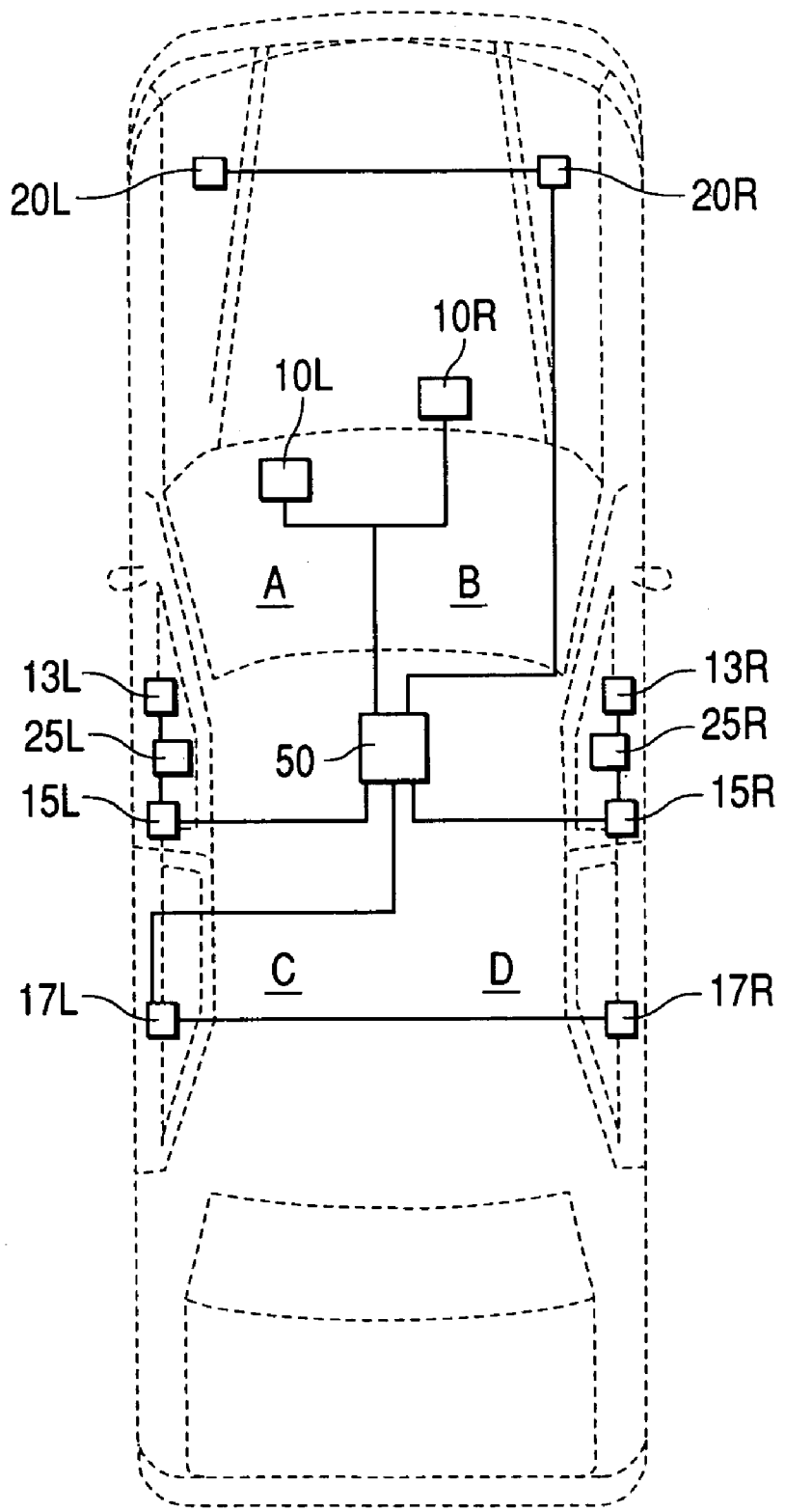
FIG. 1 shows a plan view showing an overall arrangement of a vehicle.

Preferred embodiments of the present invention will be explained hereinafter with reference to attached drawings.

Airbag and Seatbelt Pretensioner

The automotive vehicle is, for example, equipped with one or two front airbags disposed inside an instrument panel or at the front side of front seats and side airbags accommodated in side doors or in side pillars positioned at both right and left sides of the front and/or rear seats. The present invention does not inevitably require including both of the front airbags and the side airbags.

Furthermore, seatbelt pretensioners are installed at both right and left sides of the front seats and the rear seats. The seatbelt pretensioners have a function of giving a pre-tension to the seatbelt. The present invention, however, does not inevitably require including these tensioners.

Acceleration Sensor Module

The present invention is applicable to any one of a front acceleration sensor module installed in a front region of the vehicle, a side acceleration sensor module installed in a side region of the vehicle, and a central acceleration sensor module installed in a central region of the vehicle.

A. Front and/or Side Acceleration Sensor Module (A-1) Acceleration Sensor Module Two front acceleration sensor modules are installed in a bumper at both a front left region and a front right region of the vehicle. Two or more side acceleration sensor modules are installed in the side doors and/or in the B pillars (i.e. center pillars) at both a left side region and a right side region of the vehicle. The front acceleration sensor modules detect the collision or accident occurring in the front side of the vehicle. The side acceleration sensor modules detect the collision or accident occurring at both left and right sides of the vehicle.

A front left acceleration sensor module and a front right acceleration sensor module are identical with each other in arrangement. A left side acceleration sensor module and a right side acceleration sensor module are identical with each other in arrangement. Furthermore, it is preferable that the front acceleration sensor modules and the side acceleration sensor modules are identical with each other in arrangement. Each acceleration sensor module is roughly classified into a sensing section and an adjusting section which are mounted on a semiconductor chip having rectangular sides of several millimeters.

(A-2) Sensing Section

The sensing section has the capability of detecting a change of acceleration occurring in the vehicle. The sensing section includes a capacitive detecting section and a converting section. Furthermore, the sensing section can include an amplifying section. The detecting section is a capacitive type although its detailed structure is not limited to a specific one. The converting section converts a capacitance value into a voltage value and is, for example, arranged by a switched capacitor.

(A-3) Adjusting Section

The adjusting section has the capability of adjusting a detection result produced from the sensing section into a signal suitable for the collision judgment. The adjusting section includes a power source section, an AD converter, and a communication circuit. The power source section supplies electric power to respective constituent components of the adjusting section and to the components of the above-described sensing section. The AD converter converts an output (i.e. an analog signal) of the sensing section into a digital signal. The communication circuit transmits the digital signal to a collision judging section. The AD converter is not limited to a specific type and accordingly can be selected from various kinds of converters.

(A-4) Oscillator

According to this embodiment, the oscillator is incorporated in either the sensing section or the adjusting section. In this respect, the front and/or side acceleration sensor modules can be classified into two types according to the location of the oscillator which is installed in either the sensing section or the adjusting section. According to the first type, the oscillator is incorporated in the adjusting section and the converting section of the sensing section receives the clock supplied from the oscillator of the adjusting section. It is desirable to provide a constant delay (time difference) between the capacitance-voltage conversion performed in response to the clock and the electric power supply performed in response to the clock.

According to the second type, the oscillator is incorporated in the sensing section and the AD converter of the adjusting section receives the clock supplied from the oscillator of the sensing section. It is desirable to provide a constant delay (time difference) between the AD conversion of the AD converter in the adjusting section performed in response to the clock and the electric power supply performed in response to the clock. Setting of the delay can be realized by using a delay circuit including a constant current circuit and a capacitor.

B. Central Acceleration Sensor Module (B-1) Central Acceleration Sensor Module The central acceleration sensor module is installed in the central region of the vehicle. The central acceleration sensor module includes a sensing section, an AD converter, a collision judging section, a power source section, and an oscillator. The sensing section detects the acceleration in the central region of the vehicle in case of collision or accident of the vehicle. The AD converter converts the detection result into a digital value. Then, the AD converter sends the digital detection value to the collision judging section. The power source section supplies electric power to each of the sensing section, the AD converter, and the collision judging section. The oscillator supplies the clock to the sensing section and to the AD converter. In other words, the sensing section and the AD converter commonly use the oscillator.

The collision judging section stores a crush algorithm corresponding to the type of vehicle, obtained through the programming based on a collision test. The collision judging section judges the probability of collision or accident of the vehicle based on the input from the sensing section. When the probability is high, the collision judging section sends activation signals to the airbag inflators and to the gas generating devices of the seatbelt pretensioners. In any case, it is preferable that there is a constant delay between the noise occurring on the power source voltage in response to the clock and the capacitance-voltage conversion performed by the sensing section and/or the AD conversion performed by the AD converter.

(B-2) Receiving Circuit

The central acceleration sensor module can include a receiving circuit. The receiving circuit receives electric power from the power source section. Furthermore, the receiving circuit receives acceleration signals detected by the above-described front and/or side acceleration sensor modules and outputs the acceleration signal to the collision judging section. The collision judging section judges the probability of collision or accident of the vehicle based on the signals sent from the sensing section and from the receiving circuit.

C. Related Matters

The clock generated from only one oscillator is commonly used by a plurality of devices. It is therefore desirable to provide appropriate countermeasures available in the event of malfunctions occurring in the oscillator and the clock (i.e. failure of the clock circuit). In this respect, it is desirable to accurately and promptly detect such malfunctions or failures. Furthermore, considering the increase of damage (open, leak, etc.) of connecting wires, it is preferable to provide vacant terminals next to the clock output and input terminals or adopt a terminal layout capable of accurately detecting the occurrence of short circuit. Moreover, as the wiring for the clock exists out of the device, the wiring noise will give adverse effect on the device. However, this effect will be reduced by locating the sensor output wire far from the clock wire or by shielding the clock wire to the ground potential.

Hereinafter, preferred embodiments of the present invention will be explained with reference to attached drawings.

First Embodiment

Airbag and Seatbelt

FIG. 1 is a plan view showing an overall arrangement of a vehicle. A front left airbag 10L is installed in a steering wheel in front of a driver's seat A. On the other hand, a front right airbag 10R is installed in an instrument panel in front of a passenger seat B. A left side airbag 13L is installed in a left side door or in a left side pillar located next to the driver's seat A. Similarly, a right side airbag 13R is installed in a right side door or in a right side pillar located next to the passenger seat B.

Furthermore, a front left seatbelt pretensioner 15L is installed at the left side of the driver's seat A and a front right seatbelt pretensioner 15R is installed at the right side of the passenger seat B. Similarly, a rear left seatbelt pretensioner 17L is installed at the left side of a rear left seat C. And, a rear right seatbelt pretensioner 17R is installed at the right side of a rear right seat D.

Front Collision/Side Collision Acceleration Sensor Modules

A front left collision acceleration sensor module 20L is installed in the front left region of the vehicle. A front right collision acceleration sensor module 20R is installed in the front right region of the vehicle. Furthermore, a left side collision acceleration sensor module 25L is installed between the left side airbag 13L and the front left pretensioner 15L. A right side collision acceleration sensor module 25R is installed between the right side airbag 13R and the front right pretensioner 15R.

Figure 2:
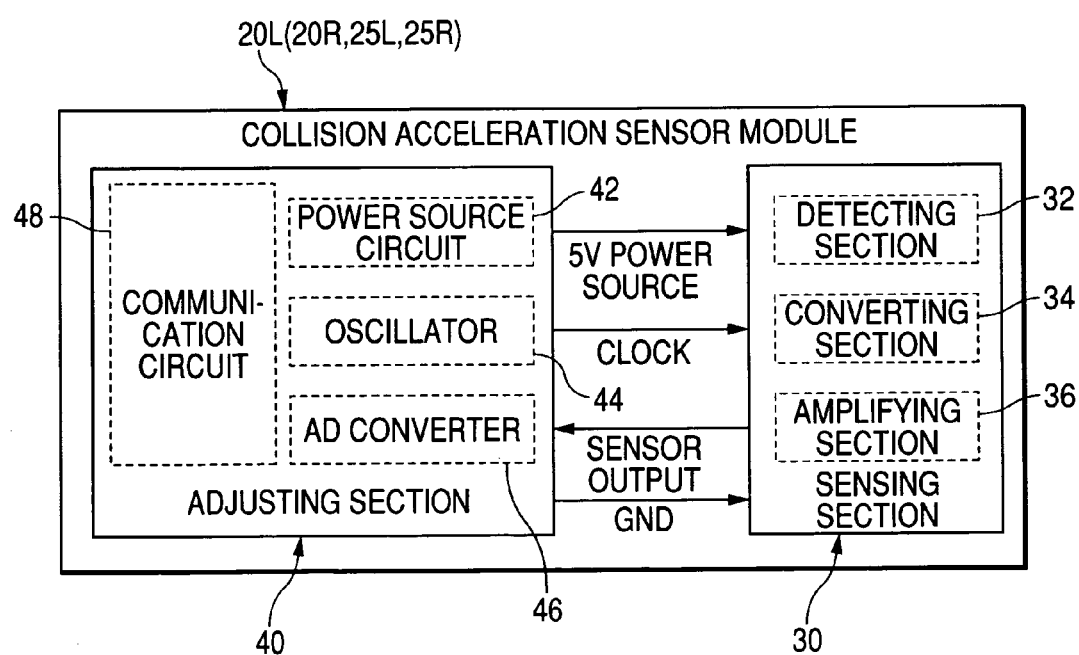
FIG. 2 is a block diagram showing a front left collision acceleration sensor module shown in FIG. 1.

The above-described four collision acceleration sensor modules 20L, 20R, 25L, and 25R are basically identical with each other in arrangement. For example, as shown in FIG. 2, the front left collision acceleration sensor module 20L consists of a sensing section 30 and an adjusting section (peripheral IC) 40. The sensing section 30 includes a detecting section 32, a converting section 34, and an amplifying section 36. The detecting section 32 is a capacitive type which has a beam structure including a pair of comb-like stationary and movable electrodes cooperatively forming a capacitor (not shown). When the acceleration acts in a predetermined direction, the movable electrode causes a displacement relative to the stationary electrode in this direction. As a result, the gap between the stationary electrode and the movable electrode changes, and the electrostatic capacity between them changes correspondingly.

The converting section 34 is arranged by a switched capacitor including a capacitor, a switch, and an oscillator. The converting section 34 converts the electrostatic capacity detected by the detecting section 32 into a voltage value. The electrostatic capacity of the capacitor changes in response to one and off of the switch. The on and off of the switch is controlled by the clock supplied from the oscillator. The amplifying section 36 amplifies the voltage converted by the converting section 34.

The front left collision acceleration sensor module 20L chiefly detects the acceleration in the front left region of the vehicle. The front right collision acceleration sensor module 20R chiefly detects the acceleration in the front right region of the vehicle. The left side collision acceleration sensor module 25L chiefly detects the acceleration in the left side region of the vehicle. The right side collision acceleration sensor module 25R chiefly detects the acceleration in the right side region of the vehicle.

The adjusting section 40 includes a power source circuit 42, an AD converter 46, a communication circuit 48, and an oscillator 44. The power source circuit 42 supplies electric power (e.g. 5V power output) to each of the oscillator 44, the AD converter 46, and the communication circuit 48. Furthermore, the power source circuit 42 supplies electric power to the sensing section 30. The AD converter 46 receives an analog output of the amplifier 36 of the sensing section 30 and converts it into a digital output. The communication circuit 48 receives the digital output from the AD converter 46 and transmits it to a central acceleration sensor module 50 (which will be explained later). The oscillator 44 supplies the clock to the AD converter 44 and to the converting section 34 of the sensing section 30.

Central Acceleration Sensor Module

Figure 3:
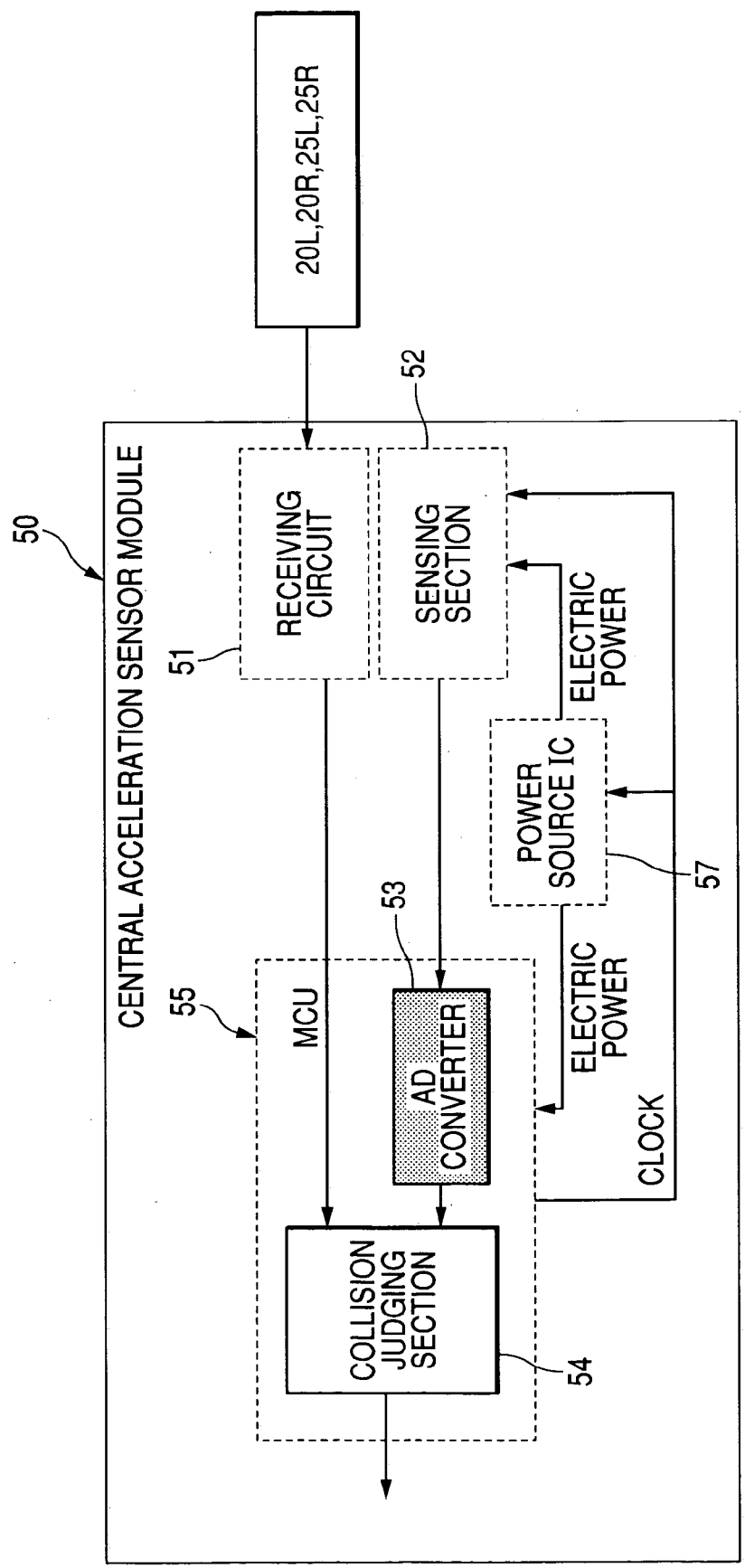
FIG. 3 is a block diagram showing a central acceleration sensor module shown in FIG. 1.

Returning to FIG. 1, the central acceleration sensor module 50 disposed in the vehicle body consists of a receiving circuit 51, a sensing section 52, MCU 55, and a power source IC 57 as shown in FIG. 3. The receiving circuit 51 receives acceleration signals from the above-described front collision acceleration sensor modules 20L and 20R and from the side collision acceleration sensor modules 25L and 25R. The receiving circuit 51 sends the received acceleration signals to a collision judging section 54 of MCU 55. The sensing section 52 is identical in arrangement with the sensing section 30 of the above-described front left collision acceleration sensor module 20L. The sensing section 52 chiefly detects the acceleration occurring in the central region of the vehicle. The sensing section 52 sends the detected acceleration to an AD converter 53 of MCU 55.

MCU 55 includes the AD converter 53 and the collision judging section 54. The AD converter 53 converts an analog signal sent from the sensing section 52 into a digital signal. The collision judging section 54 judges the probability of collision or accident of the vehicle based on the acceleration signals sent from the receiving circuit 51 and from the AD converter 53 with reference to the pre-programmed reference values. The power source IC 57 supplies electric power to the sensing section 52 and also supplies electric power to MCU 55. MCU 55 includes an oscillator (not shown) which supplies the clock to the sensing section 52 and to the power source IC 57. The clock is used for respective blocks of power source IC 57 other than the power source section. No clock is required for the output function of the power source.

Functions

The above-described practical embodiment of the present invention has the following functions.

Overall Functions

For example, if a vehicle driving or traveling with a significant speed collides with an obstacle on or by the road, the vehicle will be suddenly subjected to a negative acceleration caused by the collision. A total of four acceleration sensor modules, i.e. the front left and front right collision acceleration sensor modules 20L and 20R and the left side and right side collision acceleration sensor modules 25L and 25R, detect this negative acceleration at their sensing sections 30.

These acceleration sensor modules transmit the detection result, via the communication circuits 48 of their adjusting sections 40, to the receiving circuit 51 of the central acceleration sensor module 50. The detection result received by the receiving circuit 51 of the central acceleration sensor module 50 is then sent to the collision judging section 54 of MCU 55.

Meanwhile, the sensing section 52 of the central acceleration sensor module 50 detects the collision or accident of the vehicle. The detection result of the sensing section 52 is sent to the collision judging section 54 via the AD converter 53 of MCU 55.

Acceleration Sensor Module

Figure 4:
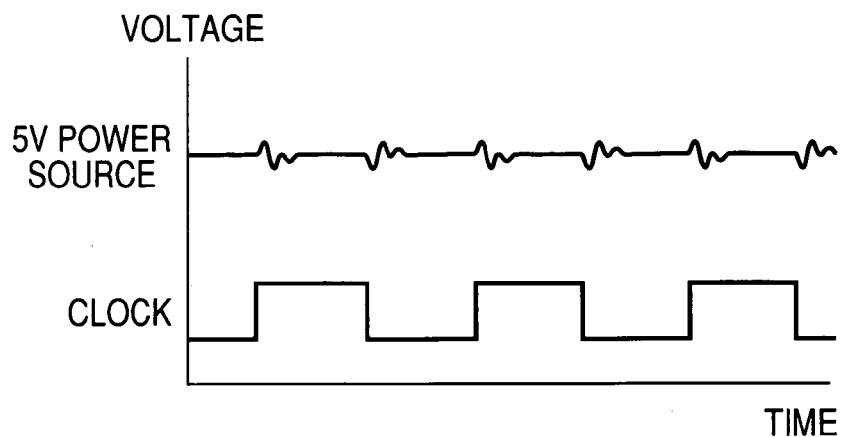
FIG. 4 is a graph showing a relationship between the clock and the voltage variation occurring in the 5V power output.

According to the front left collision acceleration sensor module 20L shown in FIG. 2, the power source circuit 42 of the adjusting section 40 supplies electric power to the sensing section 30. The converting section 34 performs the capacitance-voltage conversion in synchronism with the clock supplied from the adjusting section 40. The AD converter 46 performs the AD conversion in response to the clock supplied from the oscillator 44. Therefore, as shown in FIG. 4, a significant amount of noise may appear on the 5V power output at both rise and fall timings of the clock.

According to the central acceleration sensor module 50 shown in FIGS. 1 and 3, the power source IC 57 supplies electric power to each of the sensing section 52 and the AD converter 53. Furthermore, the sensing section 52 performs the capacitance-voltage conversion based on the clock.

The AD converter 53 performs the AC conversion in response to the clock. Therefore, a significant amount of noise may also appear on the power source voltage supplied from the power source IC 57.

Collision Judgment

The collision judging section 54 makes a judgment based on the signals entered from the receiving circuit 51 and from the AD converter 53 as to whether or not any collision or accident occurs at least at one of the front left region, the front right region, the left side region, and the right side region of the vehicle. For example, if the collision occurs in the front left region of the vehicle, the front left collision acceleration sensor module 20L will generate a large output compared with the outputs of other acceleration sensor modules 20R, 25L, and 25R. Thus, the collision judging section 54 can decide that the collision has occurred in the front left region of the vehicle Prior to inflating the airbag, any one of the seatbelt pretensioners 15L, 15R, 17L, and 17R starts increasing the tension (i.e. tensile force) of the seatbelt of a corresponding seat so as to firmly hold the driver or a passenger. Thus, it becomes possible to prevent the driver's or passenger's body from moving forward in the event of collision or accident.

Effects

The above-described embodiment brings the following effects.

First, in each of the front collision acceleration sensor modules 20L and 20R or in the side collision acceleration sensor modules 25L and 25R, the noise appearing on the 5V power output of the power source circuit 42 dose not cause any interference with the capacitance-voltage conversion performed by the converting section 34 of the sensing section 30.

The following is the reasons.

Figure 5:
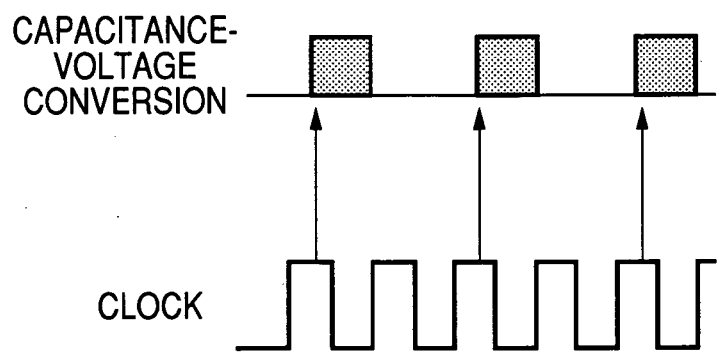
FIG. 5 is a graph showing a relationship between the clock and the capacitance-voltage conversion.

As shown in FIG. 2, the sensing section 30 includes no oscillator and the converting section 34 operates in response to the clock supplied from the oscillator 44 provided in the adjusting section 40. Moreover, as shown in FIG. 5, the converting section 34 performs the capacitance-voltage conversion at staggered timings not agreeing with the rise and fall timings of the clock generated from the oscillator 44. More specifically, the converting section 34 performs the capacitance-voltage conversion sufficiently later than the timings the voltage variation or fluctuation occurs due to clock of the oscillator 44, namely after the voltage variation or fluctuation has completely disappeared. Therefore, the noise appearing on the 5V power output give no adverse effect on the capacitance-voltage conversion performed in the converting section 34.

Second, in the central acceleration sensor module 50, the noise appearing on the power output of the power source IC 57 dose not cause any interference with the AD conversion performed by the AD converter 53.

The following is the reasons.

Figure 6:
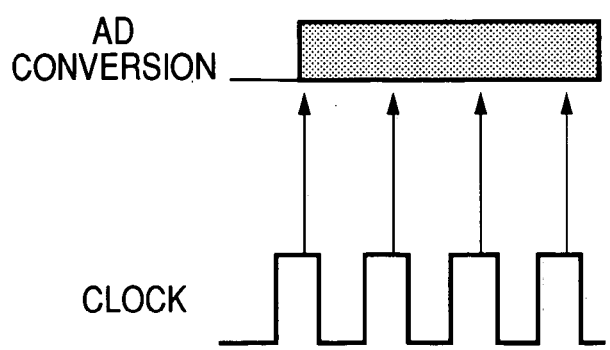
FIG. 6 is a graph showing a relationship between the clock and the AD conversion.

As shown in FIG. 6, the AD converter 53 performs the AD conversion at staggered timings not agreeing with the rise and fall timings of the clock generated from the oscillator (not shown). More specifically, the AD converter 53 performs the AD conversion sufficiently later than the timings the voltage variation or fluctuation occurs due to the clock of the oscillator, namely after the voltage variation or fluctuation has completely disappeared. By the reasons described above for the sensing section 30, the noise appearing on the power source voltage give no adverse effect on the sensing section 52.

Third, only one oscillator 44 can be used in each of the above-described acceleration modules 20L, 20R, 25L, and 25R. Thus, these acceleration modules are simple in arrangement.

Fourth, in addition to the sensing sections 30 provided in the front collision acceleration sensor modules 20L and 20R as well as in the side collision acceleration sensor modules 25L and 25R, the sensing section 52 is provided in the central acceleration sensor module 50. This is effective in accurately detecting the collision or accident of the vehicle. For example, in an event of the collision or accident occurred in the front left region of the vehicle, it is possible to trigger the inflating action of the front left airbag 10L only when both the front left collision acceleration sensor module 20L and the central acceleration sensor module 50 detect the collision or accident of the vehicle. This leads to an accurate control for respective airbags. No erroneous inflation of the airbag will occur in response to other causes, such as a quick application of the brake.

Comparative Example

Figure 8:
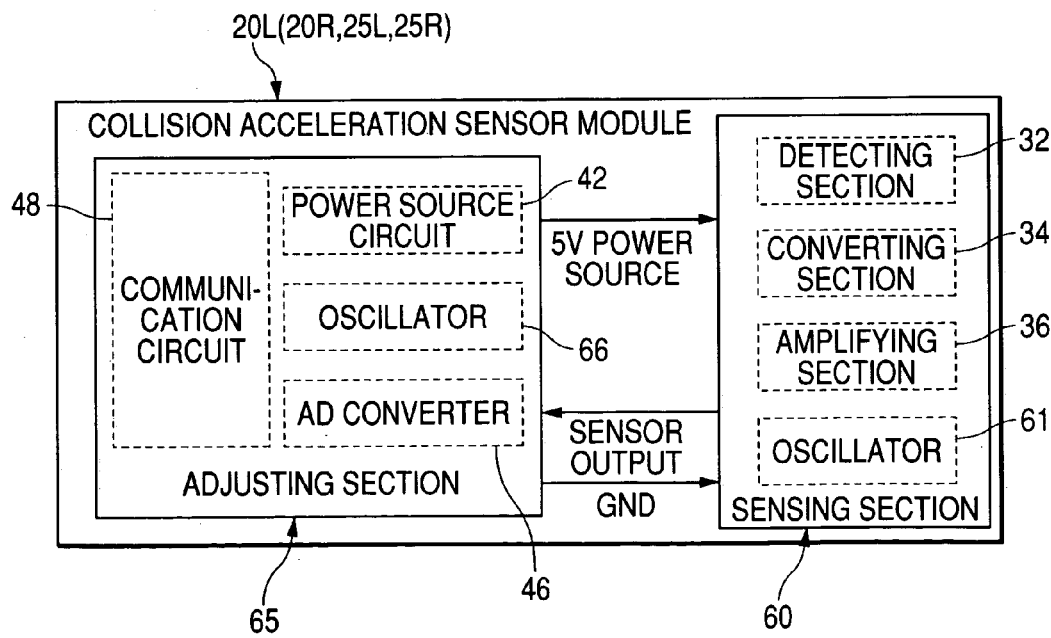
FIG. 8 is a block diagram showing a comparative example corresponding to FIG. 2.
Figure 9:
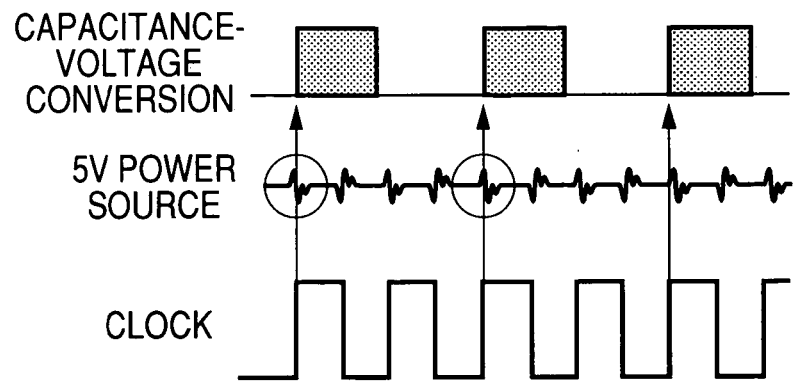
FIG. 9 is a graph showing the relationship between the clock, the voltage variation occurring in the 5V power output, and the capacitance-voltage conversion in the comparative example.
Figure 10:
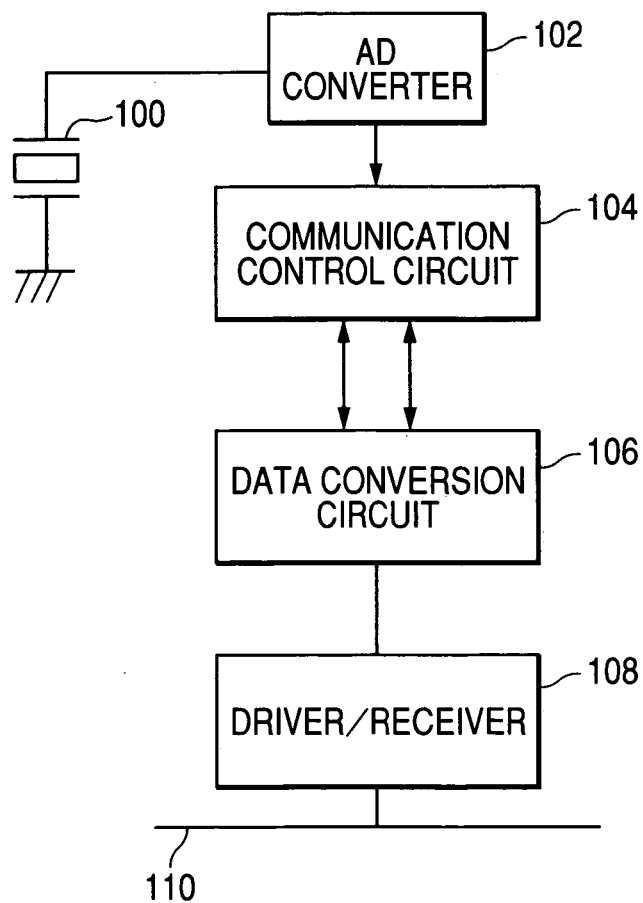
FIG. 10 is a block diagram showing a conventional acceleration sensor module.

FIGS. 8 and 9 show a comparative example.

According to this comparative example, the front left collision acceleration sensor module 20L includes a sensing section 60 and an adjusting section 65. The sensing section 60 detects a change of acceleration occurring in the vehicle. The adjusting section 65 processes the detection result and sends the processed result to the central acceleration sensor module 50.

The sensing section 60 includes an oscillator 61 in addition to the above-described components of the sensing section 30, i.e. the capacitive detecting section 32, the converting section 34 and the amplifying section 36.

The oscillator 61 supplies the clock to the converting section 34. The adjusting section 65 includes an oscillating section 66 in addition to the above-described components of the adjusting section 40, i.e. the power source circuit 42, the AD converter 48, and the communication circuit 46. The oscillating section 66 supplies the clock to each of the AD converter 46 and the communication circuit 48. In short, according to this comparative example, the oscillators 61 and 66 are separately provided for the sensing section 60 and the adjusting section 65.

The oscillators 61 and 66 should be manufactured to operate at the same frequencies. However, due to manufacturing errors, the clocks of these oscillators 61 and 66 possibly generate at different timings. As a result, the noise appearing on the 5V power output will give adverse effect on the capacitance-voltage conversion performed by the converting section 34. Even if a constant delay is provided beforehand for the capacitance-voltage conversion, the timing difference will accumulate gradually and induce the noise to interfere with the capacitance-voltage conversion.

If the sensing sections 30 and 60 have the resolution of 8-bit, 1LSB for the power source voltage of 5V will be approximately 20 mV. However, recently developed airbags are required to have advanced functions and high accuracy. If the required resolution is increased to 10-bit to satisfy these requests, the above-described 1LSB will become approximately 5 mV. The adverse effect given from the noise appearing on the power source voltage will become very large.

Second Embodiment

Figure 7:
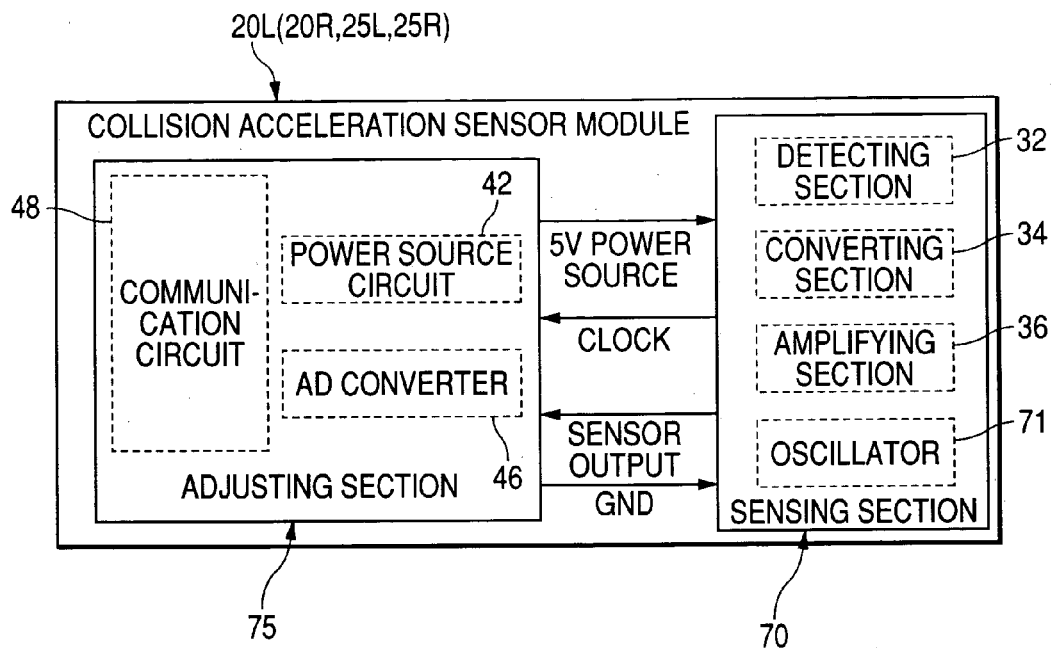
FIG. 7 is a block diagram showing a modified embodiment of the front left collision acceleration sensor module, corresponding to the sensor module shown in FIG. 2.

FIG. 7 shows a second embodiment of the present invention. The sensing section of this embodiment includes a capacitive detecting section 32, a converting section 34, an amplifying section 36, and an oscillating section 71. The capacitive detecting section 32 detects the acceleration of the vehicle. The converting section 34 converts a detected electrostatic capacity into a voltage value. The amplifying section 36 amplifies the converted signal. The oscillating section 71 supplies the clock to each of the converting section 34 and the adjusting section 75.

The adjusting section 75 includes a power source circuit 42, an AD converter 46, and a communication circuit 48. The power source circuit 42 supplies electric power to the AD converter 46 and to the communication circuit 48. Furthermore, the power source circuit 42 supplies electric power to the sensing section 70. The converting section 34 performs the capacitance-voltage conversion in response to the clock. And, the AD converter 46 performs the AD conversion in response to the clock.

The second embodiment brings the following effects.

As the AD converter 46 performs the AD conversion in response to the clock supplied from the oscillator 71, it is possible to surely shift the timing of the AD conversion performed by the AD converter 46 relative to the timing of the 5V power output supply to the sensing section 70. Thus, the second embodiment can prevent the noise appearing on the power source voltage from giving adverse effect on the AD conversion.

What is claimed is:

1. A front and/or side acceleration sensor module installed in a front region and/or a side region of a vehicle, comprising a sensing section and an adjusting section, wherein
said sensing section comprises:
a capacitive detecting section for detecting an acceleration of said vehicle; and
a converting section for converting a capacitance value into a voltage value, and
said adjusting section comprises:
an AD converter for converting an analog output of said converting section into a digital value;
a communication circuit for sending an output of said AD converter to a collision judging section;

a power source section for supplying electric power to each of said AD converter, said communication circuit, and said sensing section; and an oscillator for supplying clock to said AD converter and to said converting section of said sensing section.

2. The front and/or side acceleration sensor module in accordance with claim 1, wherein said converting section performs capacitance-voltage conversion and said AD converter performs AD conversion at staggered timings not agreeing with a rise or a fall of said clock.

3. The front and/or side acceleration sensor module in accordance with claim 1, wherein said collision judging section is disposed in a central acceleration sensor module installed in a central region of the vehicle.

4. A front and/or side acceleration sensor module installed in a front region and/or a side region of a vehicle, comprising a sensing section and an adjusting section, wherein said sensing section comprises:
  a capacitive detecting section for detecting an acceleration of said vehicle;
  a converting section for converting a capacitance value into a voltage value; and
  an oscillating section for supplying clock to said converting section, said adjusting section comprises:
  an AD converter for receiving the clock supplied from said oscillating section and converting an analog output of said converting section into a digital value;
  a communication circuit for sending an output of said AD converter to a collision judging section; and
  a power source section for supplying electric power to each of said AD converter, said communication circuit, and said sensing section.

5. The front and/or side acceleration sensor module in accordance with claim 4, wherein said AD converter performs AD conversion and said converting section performs capacitance-voltage conversion at staggered timings not agreeing with a rise or a fall of said clock.

6. The front and/or side acceleration sensor module in accordance with claim 4, wherein said collision judging section is disposed in a central acceleration sensor module installed in a central region of the vehicle.

7. A central acceleration sensor module installed in a central region of a vehicle, comprising:
  a sensing section including a capacitive detecting section for detecting an acceleration of said vehicle and a converting section for converting a capacitance value to a voltage value,
  an AD converter for converting an analog output of said converting section into a digital value;
  a collision judging section for judging a probability of collision of said vehicle based on an input from said AD converter;
  a power source section for supplying electric power to each of said sensing section, said AD converter, and said collision judging section; and
  an oscillating section for supplying clock to said sensing section and to said AD converter.

8. The central acceleration sensor module in accordance with claim 7, further comprising
  a receiving circuit for receiving an acceleration signal detected by a front and/or side acceleration sensor module installed in a front region and/or a side region of a vehicle and for outputting said acceleration signal to said collision judging section, and
  said receiving circuit receives electric power supplied from said power source section.

* * * * *